US011484796B1

(12) United States Patent
Cunningham et al.

(10) Patent No.: US 11,484,796 B1
(45) Date of Patent: Nov. 1, 2022

(54) SYSTEMS AND METHODS FOR FACILITATING DISTRIBUTION OF IN-GAME INSTRUCTIONS PERTAINING TO AN ONLINE GAMING PLATFORM

(71) Applicant: Mythical, Inc., Sherman Oaks, CA (US)

(72) Inventors: Stephan Cunningham, Pasadena, CA (US); Cameron Thacker, Sherman Oaks, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 16/292,023

(22) Filed: Mar. 4, 2019

(51) Int. Cl.
  *A63F 13/63* (2014.01)
  *A63F 13/73* (2014.01)
  *A63F 13/30* (2014.01)

(52) U.S. Cl.
  CPC .............. *A63F 13/63* (2014.09); *A63F 13/30* (2014.09); *A63F 13/73* (2014.09); *A63F 2300/201* (2013.01); *A63F 2300/6018* (2013.01)

(58) Field of Classification Search
  CPC ........... A63F 13/30; A63F 13/63; A63F 13/73
  USPC ......................................................... 463/29
  See application file for complete search history.

(56) References Cited

U.S. PATENT DOCUMENTS

| 6,119,229 | A | 9/2000 | Martinez |
| 6,764,401 | B1 | 7/2004 | Akatsuka |
| 7,593,864 | B2 | 9/2009 | Shuster |
| 8,041,614 | B2 | 10/2011 | Bhogal |
| 8,292,736 | B2 | 10/2012 | Kato |
| 9,384,067 | B2 | 7/2016 | Chen |
| 9,511,281 | B1 | 12/2016 | Mclellan |
| 2002/0059120 | A1 | 5/2002 | Milton |
| 2004/0266505 | A1 | 12/2004 | Keam |
| 2006/0046839 | A1* | 3/2006 | Nguyen .................. G07F 17/32 463/25 |
| 2006/0116194 | A1 | 6/2006 | Pacey |
| 2006/0242269 | A1 | 10/2006 | Gross |
| 2007/0105630 | A1* | 5/2007 | Van Luchene ......... G06Q 30/04 463/42 |
| 2009/0201299 | A1 | 8/2009 | Bhogal |
| 2009/0204628 | A1 | 8/2009 | Bhogal |
| 2009/0287707 | A1 | 11/2009 | Lyle |
| 2009/0312080 | A1 | 12/2009 | Hamilton, II |

(Continued)

*Primary Examiner* — Peter S Vasat
*Assistant Examiner* — Wei Lee
(74) *Attorney, Agent, or Firm* — Esplin & Associates, PC (57) ABSTRACT

Systems and methods for facilitating distribution of in-game instructions pertaining to an online gaming platform are disclosed. Exemplary implementations may: create an asset that includes and/or refers to a set of in-game instructions provided by a first user of the online gaming platform; receive a request, from a second user of the online gaming platform, for execution of the set of in-game instructions to facilitate a first transformation of one or more particular in-game assets; perform a first verification whether the second user owns the asset; and transform the one or more particular in-game assets into one or more particular transformed and/or new in-game assets in accordance with the set of in-game instructions and the request for the first transformation, responsive to the first verification verifying that the second user owns the asset.

14 Claims, 4 Drawing Sheets

(56) References Cited

U.S. PATENT DOCUMENTS

| | | | |
|---|---|---|---|
| 2010/0041470 A1* | 2/2010 | Preisach | G07F 17/32 |
| | | | 463/25 |
| 2010/0280919 A1 | 11/2010 | Everett | |
| 2011/0009192 A1 | 1/2011 | Aronzon | |
| 2011/0021269 A1 | 1/2011 | Wolff-Peterson | |
| 2011/0124415 A1 | 5/2011 | Shimono | |
| 2011/0172007 A1 | 7/2011 | Sulyok | |
| 2012/0244945 A1* | 9/2012 | Kolo | A63F 13/58 |
| | | | 463/42 |
| 2012/0283019 A1* | 11/2012 | Veprinsky | A63F 13/69 |
| | | | 463/42 |
| 2013/0059663 A1 | 3/2013 | Kurlancheek | |
| 2013/0130797 A1* | 5/2013 | Stone | G06F 3/01 |
| | | | 463/36 |
| 2013/0143670 A1 | 6/2013 | Junkin | |
| 2013/0190096 A1 | 7/2013 | Ronen | |
| 2014/0206452 A1 | 7/2014 | Bambino | |
| 2015/0099575 A1* | 4/2015 | Elias | G07F 17/3267 |
| | | | 463/25 |
| 2016/0107087 A1* | 4/2016 | Miura | A63F 13/70 |
| | | | 463/29 |
| 2019/0130701 A1* | 5/2019 | Simons | H04L 9/3239 |
| 2019/0192978 A1* | 6/2019 | Eatedali | A63F 13/79 |

* cited by examiner

Fig. 1

Fig. 2 mythical creature 31

Fig. 3A mythical creature 32

SYSTEMS AND METHODS FOR FACILITATING DISTRIBUTION OF IN-GAME INSTRUCTIONS PERTAINING TO AN ONLINE GAMING PLATFORM

FIELD OF THE DISCLOSURE

The present disclosure relates to systems and methods for facilitating distribution of in-game instructions pertaining to an online gaming platform.

BACKGROUND

Online gaming platforms are known. Selling digital in-game assets to the users of online gaming platforms is known. Transferring in-game virtual items between users of online gaming platforms is known.

SUMMARY

One aspect of the present disclosure relates to a system configured for facilitating distribution of in-game instructions pertaining to an online gaming platform. The system may include one or more hardware processors configured by machine-readable instructions. The processor(s) may be configured to create an asset that includes and/or refers to a set of in-game instructions provided by a first user of the online gaming platform. Execution of the set of in-game instructions may facilitate a transformation of one or more in-game assets into one or more transformed and/or new in-game assets. The set of in-game instructions may specify one or more steps within the online gaming platform that perform the transformation of the one or more in-game assets. Completion of the transformation may require ownership of the asset. The processor(s) may be configured to receive a request, from a second user of the online gaming platform, for execution of the set of in-game instructions to facilitate a first transformation of one or more particular in-game assets. The processor(s) may be configured to perform a first verification whether the second user owns the asset. The processor(s) may be configured to transform the one or more particular in-game assets into one or more particular transformed and/or new in-game assets in accordance with the set of in-game instructions and the request for the first transformation, responsive to the first verification verifying that the second user owns the asset.

Another aspect of the present disclosure relates to a method for facilitating distribution of in-game instructions pertaining to an online gaming platform. The method may include creating an asset that includes and/or refers to a set of in-game instructions provided by a first user of the online gaming platform. Execution of the set of in-game instructions may facilitate a transformation of one or more in-game assets into one or more transformed and/or new in-game assets. The set of in-game instructions may specify one or more steps within the online gaming platform that perform the transformation of the one or more in-game assets. Completion of the transformation may require ownership of the asset. The method may include receiving a request, from a second user of the online gaming platform, for execution of the set of in-game instructions to facilitate a first transformation of one or more particular in-game assets. The method may include performing a first verification whether the second user owns the asset. The method may include transforming the one or more particular in-game assets into one or more particular transformed and/or new in-game assets in accordance with the set of in-game instructions and the request for the first transformation, responsive to the first verification verifying that the second user owns the asset.

As used herein, any association (or relation, or reflection, or indication, or correspondency) involving servers, processors, client computing platforms, assets, instructions, transformations, steps, ownership, requests, verifications, capabilities, sales, transfers, notifications, blockchains, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
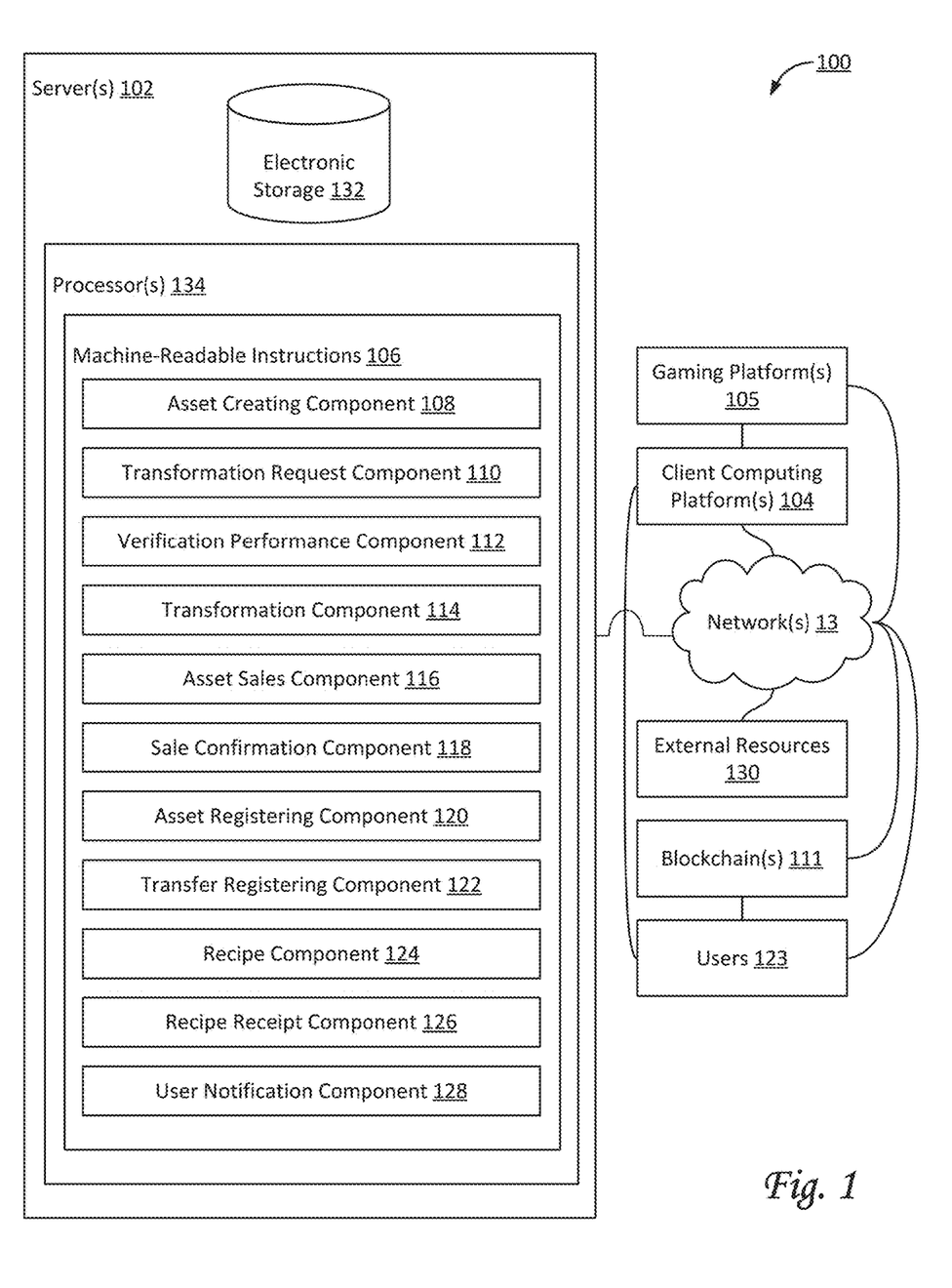
FIG. 1 illustrates a system configured for facilitating distribution of in-game instructions pertaining to an online gaming platform, in accordance with one or more implementations.

FIG. 1 illustrates a system 100 configured for facilitating distribution of in-game instructions pertaining to a gaming platform 105 (e.g., an online gaming platform), in accordance with one or more implementations. In some implementations, system 100 may include one or more of electronic storage 132, one or more servers 102, one or more client computing platforms 104, one or more gaming platforms 105, one or more blockchains 111 (e.g., a distributed blockchain), one or more external resources 130, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. Users 123 may include one or more of a first user, a second user, a third user, a fourth user, and/or other users. In some implementations, users 123 may include one or more creating users, requesting users, selling users, buying users, owning users, and/or other users. In some implementations, one or more users 123 do not need to be players of any gaming platform.

In some implementations, system 100 and/or servers 102 may be configured to communicate with one or more of (online) gaming platform(s) 105, users 123, blockchain(s) 111, and/or other components. As used herein, gaming platform 105 may refer to either an individual game, a type of gaming console and its ecosystem, and/or both. Gaming platform 105 may be operated, hosted, and/or owned by a stakeholder of gaming platform 105. Users 123 may include players who play on gaming platform 105.

In some implementations, a distributed blockchain such as blockchain 111 may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain(s) 111. The smart contracts may be stored on blockchain(s) 111. In some implementations, the distributed computing platform may be the EOSIO platform. In some implementations, the distributed computing platform may be Ethereum. In some implementations, the virtual machine may be a Turing-complete and decentralized virtual machine.

A distributed blockchain may act as a (decentralized) database that stores a registry of assets and transactions across one or more networks. A given asset may be owned by a particular user. An asset may include anything of material value or usefulness that is owned by or on behalf of a person or company, including but not limited to assets created by asset creating component 108, and/or other assets. In some implementations, a right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111.

In some implementations, blockchain(s) 111 may record and/or register ownership of assets. Alternatively, and/or simultaneously, blockchain(s) 111 may register transactions that modify ownership of assets. A smart contract may be a type of asset. In some implementations, once a smart contract has been added to a blockchain, the smart contract may be referred to as published, posted, registered, and/or recorded. Elements of blockchain(s) 111 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

Blockchain(s) 111 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of asset creating component 108, transformation request component 110, verification performance component 112, transformation component 114, asset sales component 116, sale confirmation component 118, asset registering component 120, transfer registering component 122, recipe component 124, recipe receipt component 126, user notification component 128, and/or other instruction components.

Asset creating component 108 may be configured to create assets, including but not limited to assets that may be used on one or more (online) gaming platform(s) 105. In some implementations, an asset may include and/or refer to a set of in-game instructions. In some implementations, in-game instructions may be provided by users 123 of gaming platform 105, including but not limited to a first user. Execution of the set of in-game instructions may facilitate a transformation of one or more in-game assets into one or more transformed and/or new in-game assets. For example, a particular set of instructions may facilitate a transformation of a sword into an enchanted sword, within gaming platform 105. For example, a particular set of instructions may facilitate a transformation of a particular quantity of steel, wood, and string into a crossbow, within gaming platform 105. For example, a particular set of instructions may facilitate a transformation of particular quantities of building materials into a house, within gaming platform 105. In some implementations, sets of instructions may operate as a blueprint and/or recipe. A set of in-game instructions may specify one or more steps within the online gaming platform that perform a transformation of one or more in-game assets. As used herein, the term "step" refers to one or more operations that can occur or be performed within gaming platform 105. In some implementations, an individual step may include an operation that users of gaming platform 105 can perform manually, e.g., under certain conditions and/or with certain prerequisites. In some implementations, an individual step may include an operation within gaming platform 105 that users of gaming platform 105 cannot perform manually. In some implementations, in-game assets may include avatars, characters, and/or the appearance of users 123 within gaming platform 105. In some implementations, assets that facilitate transformations may be implemented as smart contracts on blockchain 111. In some implementations, assets that facilitate transformations may use smart contracts on blockchain 111.

In some implementations, completion of a transformation as described by a particular set of in-game instructions may require ownership of the asset that includes and/or refers to the particular set of in-game instructions. In some implementations, completion of a transformation as described by a particular asset may require ownership of the particular asset. In some implementations, completion of a particular transformation may require ownership of at least one of an in-game capability, a given in-game asset, and/or one or more other objects. For example, the transformation of a sword into an enchanted sword within gaming platform 105 may require certain magical skills, as well as a non-enchanted sword (perhaps of a particular type that can be enchanted). For example, the transformation of a set of building materials into a house within gaming platform 105 may require one or more of carpentry, drywall, plumbing, roofing and electrician skills, as well as a variety of (power) tools. In some implementations, completion of a transformation may require effort, time, and/or (virtual) currency. In some implementations, transformations may be irreversible. For example, once eggs, flour, and sugar are transformed into a dessert within gaming platform 105, such a transformation may be irreversible.

Transformation request component 110 may be configured to receive requests for execution of sets of in-game instructions. In some implementations, transformation request component 110 may be configured to receive a particular request, from a particular user of gaming platform 105, for execution of a particular set of in-game instructions. In other words, the particular user may request a particular transformation of one or more particular in-game assets. In some implementations, transformation request component 110 may receive requests within gaming platform 105. In some implementations, transformation request component 110 may receive requests within a distributed computing platform, in particular blockchain 111. In some implementations, transformation request component 110 may receive requests through other components of system 100.

In some implementations, a transformation may be performed (e.g., by transformation component 114) responsive and/or subsequent to one or more verifications, including but not limited to verifications by verification performance component 112. For example, a particular transformation may be performed and/or completed responsive to verifying that the requesting user owns the asset describing the transformation. For example, a particular transformation may be performed responsive to verifying that the requesting user owns the required in-game assets. In some implementations, receiving the request from a requesting user may imply consent to transform one or more particular in-game assets currently owned by the requesting user.

Verification performance component 112 may be configured to perform one or more verifications, including but not limited to a first verification, a second verification, a third verification, and/or other verifications. In some implementations, one or more verifications may pertain to ownership of assets, abilities, and/or other objects. In some implementations, a first verification may verify whether the requesting user owns a particular asset that includes and/or refers to a particular set of in-game instructions. In some implementations, a second verification may include verifying whether the requesting user owns the one or more particular in-game assets. In some implementations, a third verification may verify whether the requesting user owns at least one of a required in-game capability (e.g., a skill) and/or a given in-game asset (e.g., a tool). In some implementations, performance and/or completion of transformations may be conditioned on the results of one or more verifications by verification performance component 112. For example, performance and/or completion of a particular transformation may be responsive to verifying that the requesting user owns at least one of a required in-game capability and a given in-game asset. In some implementations, performing a transformation may not destroy the asset that includes and/or refers to a particular set of in-game instructions. In some implementations, performing a transformation may not destroy a particular required in-game capability. In some implementations, performing a transformation may not destroy a given required in-game asset. In some implementations, completing a transformation may not destroy the asset that includes and/or refers to a particular set of in-game instructions. In some implementations, completing a transformation may not destroy a particular required in-game capability. In some implementations, completing a transformation may not destroy a given required in-game asset.

Transformation component 114 may be configured to transform one or more in-game assets into one or more transformed and/or new in-game assets. In some implementations, transformations performed by transformation component 114 may be in accordance with a set of in-game instructions. In some implementations, transformations performed by transformation component 114 may be in accordance with a request for a transformation. In some implementations, transformations performed by transformation component 114 may be performed responsive to (particular results of) one or more verifications by verification performance component 112.

In some implementations, transformations may be performed using similar rather than identical in-game assets. For example, a particular asset may include a set of in-game instructions to transform a vehicle in a prescribed manner, including lowering the suspension, increasing the size of the rims, adding tinted windows, adding a custom paint job, changing the upholstery on the seats, upgrading the exhaust system, etc. Certain transformations may be available for a variety of vehicles. In some implementations, transformations may include one or more of aesthetic changes, functional changes, performance changes, and/or other changes.

Figure 3A:
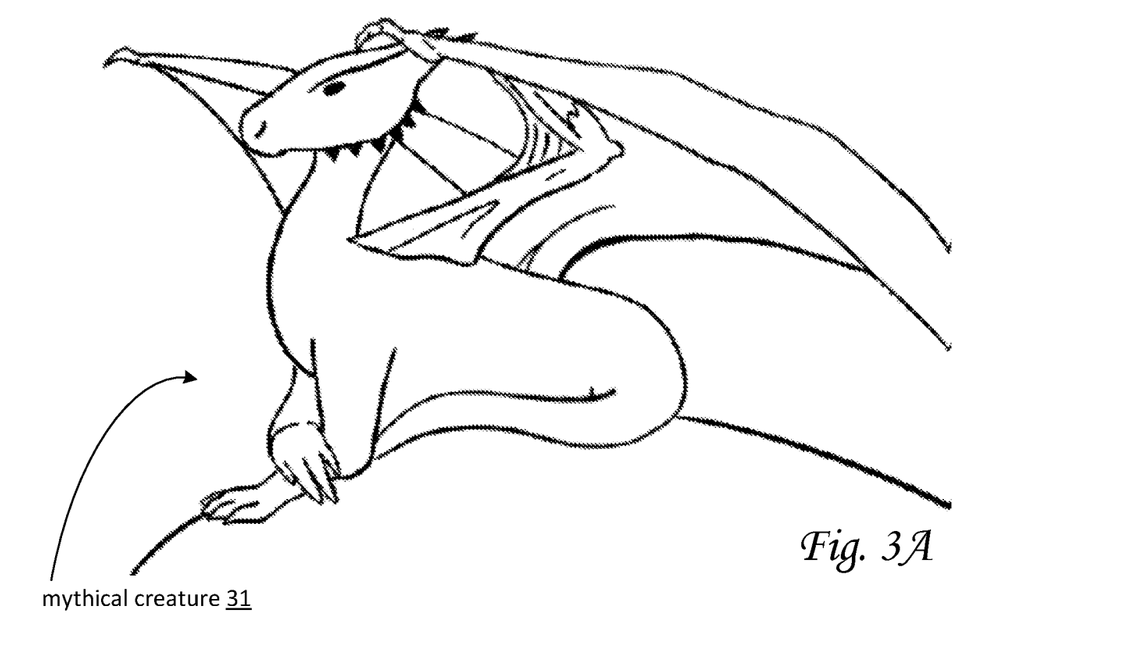
FIGS. 3A-3B illustrate an exemplary transformation as may be performed by a system configured for facilitating distribution of in-game instructions pertaining to an online gaming platform, in accordance with one or more implementations.
Figure 3B:
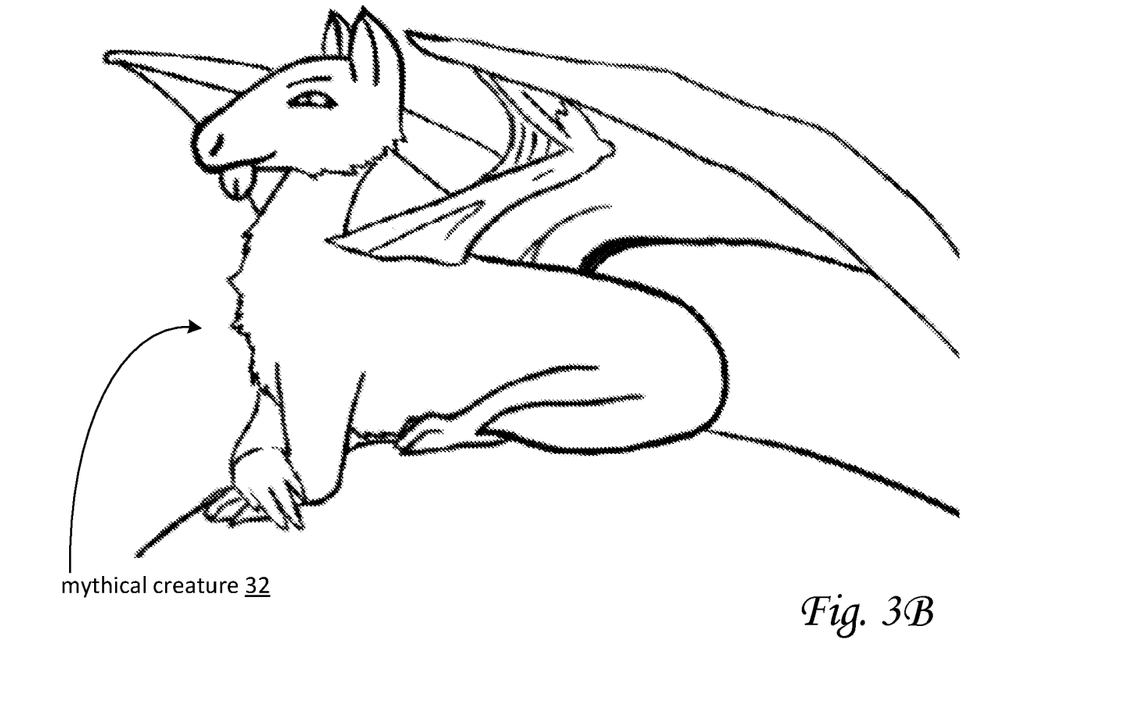

By way of non-limiting example, FIGS. 3A-3B illustrate an exemplary transformation of an in-game character as may be performed by system 100. FIG. 3A depicts a mythical creature 31 that may be some type of fire-breathing winged dragon. For example, a particular asset may include a particular set of in-game instructions to transform an in-game character, in this case mythical creature 31, into a transformed mythical creature 32 as shown in FIG. 3B. The particular set of in-game instructions may transform a creature, such as mythical creature 31, in a prescribed manner, by making the legs shorter, the tail shorter, the coat or fur longer, the body longer, the eyes and mouth friendlier, modifying the ratio of the head and the body, adding or changing dog-like ears, adding a dog-like happy tongue, etc. This particular transformation may mimic the effect of cross-breeding a creature with a corgi.

Referring to FIG. 1, asset sales component 116 may be configured to offer assets for sale, e.g., to users 123 of gaming platform 105. By way of non-limiting example, assets offers for sale may include assets that include and/or refer to a set of in-game instructions, such as, e.g., assets created by asset creating component 108. In some implementations, assets may be offered for sale through a user interface. For example, in some implementations, such a user interface may be part of gaming platform 105. In some implementations, assets may be offered for sale in a store that is external to system 100. In some implementations, assets may be offered for sale through a store interface that is external to system 100. In some implementations, assets may be offered for sale within gaming platform 105. In some implementations, assets may be offered for sale within blockchain 111. In some implementations, assets may be offered for sale in a store or through a store interface that is included in system 100.

Sale confirmation component 118 may be configured to receive information reflecting sales, including but not limited to sales of assets created by asset creating component 108. In some implementations, sale confirmation component 118 may be configured to obtain confirmation of occurrences of sales of assets. In some implementations, sale confirmation component 118 may be configured to receive information reflecting a sale of the asset to a particular user of gaming platform 105. Responsive to the sale of a particular asset, the particular asset may have been added to an inventory of the purchasing user. In some implementations, an inventory may be maintained within gaming platform 105 on behalf of the purchasing user. In some implementations, verifications by verification performance component 112 may verify whether a particular inventory of a particular user (e.g., the purchasing user) includes a particular asset.

Asset registering component 120 may be configured to register assets and/or other information on blockchain 111. The assets may include, but are not limited to, assets created by asset creating component 108. In some implementations, asset registering component 120 may be configured to register ownership of assets on blockchain 111. In some implementations, assets may include (and/or be associated with) ownership addresses of owners of the assets. For example, a transfer of ownership (e.g., due to a sale) may be registered on blockchain 111, e.g., by a change in a particular ownership address. In some implementations, verification by verification performance component 112 may include verifying whether a particular ownership address of a particular asset is associated with a particular user.

Figure 4A:
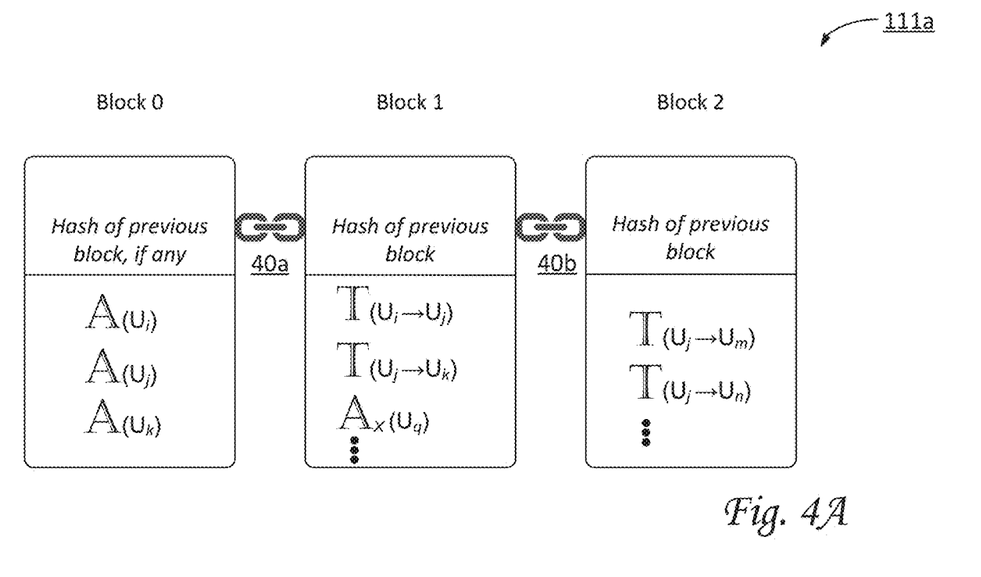
FIGS. 4A-4B illustrate exemplary blockchains as may be used by a system configured for facilitating distribution of in-game instructions pertaining to an online gaming platform, in accordance with one or more implementations.

By way of non-limiting example, FIG. 4A illustrates a blockchain 111a that implements a blockchain including a block 0, a block 1, and a block 2. As time progresses, more blocks may be added to blockchain 111a. The blocks within blockchain 111a are ordered. In block 0, three assets (indicated by a capital "A") are generated and/or assigned to three users or participants: a first asset is assigned to user i (Ui), a second asset is assigned to user j (Uj), and a third asset is assigned to user k (Uk). These assets may be individual tokens manifested, deployed, and/or instantiated through an asset creating component similar to asset creating component 108 (see FIG. 1). Block 1 is connected to block 0 (as indicated by a link 40a), for example by including an address of block 1 in block 0, or vice versa. Likewise, block 1 is connected to block 2, as indicated by a link 40b.

In block 1, one asset (labeled Ax) is generated and/or assigned to user q (Uq). For example, the asset in block 1 may be an individual token created by an asset creating component similar to asset creating component 108 (see FIG. 1). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111a may determine the current assets of blockchain 111a, and the balances of any user. In some implementations, the balance of a particular user may be verified prior to adding a transaction that reduces that particular user's balance. For example, an individual user may not be allowed to transfer assets the individual user does not own.

Referring to FIG. 1, transfer registering component 122 may be configured to register transfers of assets on blockchain 111. Transfers may occur due to sales and/or other reasons. In some implementations, transfer registering component 122 may be configured to register transfers of ownership of assets on blockchain 111. In some implementations, a transfer of the ownership of a particular asset to a particular user may be registered by modifying the ownership address of the particular asset on blockchain 111 to an address associated with the purchasing user.

Recipe component 124 may be configured to create set of in-game instructions. For example, a particular user may perform, record, and/or otherwise describe a particular set of in-game instructions. In some implementations, recipe component 124 may be configured to create a particular asset that includes and/or refers to the particular set of in-game instructions. In some implementations, asset creating component 108 may be configured to create a particular asset that includes and/or refers to the particular set of in-game instructions. For example, in some implementations, recipe component 124 may facilitate interaction through a user interface such that a user can assemble, organize, and/or otherwise modify one or more in-game instructions.

Recipe receipt component 126 may be configured to receive sets of in-game instructions from users 123. In some implementations, recipe receipt component 126 may be configured to receive sets of in-game instructions through recipe component 124, asset creating component 108, and/or other components of system 100. For example, a creating user may use an external resource to assemble a particular set of in-game instructions, and provide the particular set to system 100 through recipe receipt component 126.

User notification component 128 may be configured to notify users 123, e.g., regarding verifications by verification performance component 112. For example, user notification component 128 may be configured to present a notification to a particular user, responsive to a first verification verifying whether the particular user owns a particular asset. Such a notification may include the result of the first verification, a recommendation to remedy the source of the verification failure, and/or other information. For example, user notification component 128 may be configured to present a notification to a particular user, responsive to a second verification verifying whether the particular user owns at least one of a required in-game capability and a particular in-game asset. Such a notification may include the result of the second verification, a recommendation to remedy the source of the verification failure, and/or other information.

Figure 4B:
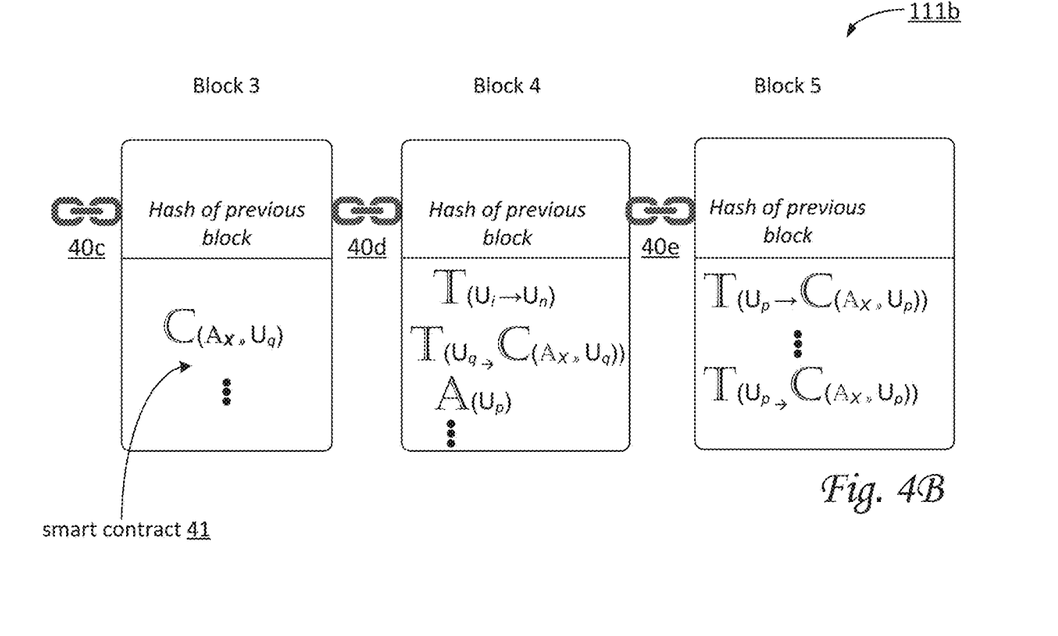

By way of non-limiting example, FIG. 4B illustrates a blockchain 111b that includes the same blocks as blockchain 111a of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, a smart contract 41 (indicated by a capital "C") is posted. For example, smart contract 41 may have been generated to implement a transformation in accordance with the set of in-game instructions included in asset Ax. For example, smart contract 41 may perform one or more verifications pertaining to a transformation. In FIG. 4B, a function call to a function defined by smart contract 41 may be depicted and/or implemented as a transaction. Smart contract 41 may have been posted to blockchain 111b by a component similar to asset registering component 120 (shown in FIG. 1). Referring to FIG. 4B, for example, smart contract 41 may include asset Ax and record that asset Ax is currently owned by user q (Uq). In block 4, one asset is generated and/or assigned to user p (Up). Additionally, block 4 includes a transaction (indicated by a capital "T"): a transaction from user i to user n. For example, the transaction may represent a purchase of a first virtual item by user n. Additionally, block 4 includes a transaction from user q to the same smart contract as depicted in block 3. For example, the transaction may represent user q requesting a transformation in accordance with the set of in-game instructions included in asset Ax. Block 5 includes two transactions (indicated by a capital "T"): a first transaction of ownership of smart contract 41 from user q to user p, and a second transaction may represent user p requesting another transformation in accordance with the set of in-game instructions included in asset Ax. For example, the first transformation (responsive to the transaction in block 4) may operate on one or more in-game assets owned by user q. For example, the second transformation (responsive to the transaction in block 5) may operate on one or more in-game assets owned by user p. Referring to FIG. 1, in some implementations, the performance of a transformation and/or a verification may be outside of a blockchain, e.g., within gaming platform 105.

Referring to FIG. 1, in some implementations, server(s) 102, client computing platform(s) 104, and/or external resources 130 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing devices.

External resources 130 may include sources of information and/or services outside of system 100, external entities participating with system 100, and/or other resources. In some implementations, some or all of the functionality attributed herein to external resources 130 may be provided by resources included in system 100. In some implementations, external resources 130 may include a store and/or store interface that offers assets for sale, including but not limited to assets that include and/or refer to sets of in-game instructions.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 108, 110, 112, 114, 116, 118, 120, 122, 124, 126, and/or 128, and/or other components. Processor(s) 134 may be configured to execute components 108, 110, 112, 114, 116, 118, 120, 122, 124, 126, and/or 128, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, and/or 128 are illustrated in FIG. 1 as being implemented within a single processing unit, in implementations in which processor(s) 134 includes multiple processing units, one or more of components 108, 110, 112, 114, 116, 118, 120, 122, 124, 126, and/or 128 may be implemented remotely from the other components. The description of the functionality provided by the different components 108, 110, 112, 114, 116, 118, 120, 122, 124, 126, and/or 128 described below is for illustrative purposes, and is not intended to be limiting, as any of components 108, 110, 112, 114, 116, 118, 120, 122, 124, 126, and/or 128 may provide more or less functionality than is described. For example, one or more of components 108, 110, 112, 114, 116, 118, 120, 122, 124, 126, and/or 128 may be eliminated, and some or all of its functionality may be provided by other ones of components 108, 110, 112, 114, 116, 118, 120, 122, 124, 126, and/or 128. As another example, processor(s) 134 may be configured to execute one or more additional components that may perform some or all of the functionality attributed below to one of components 108, 110, 112, 114, 116, 118, 120, 122, 124, 126, and/or 128.

Figure 2:
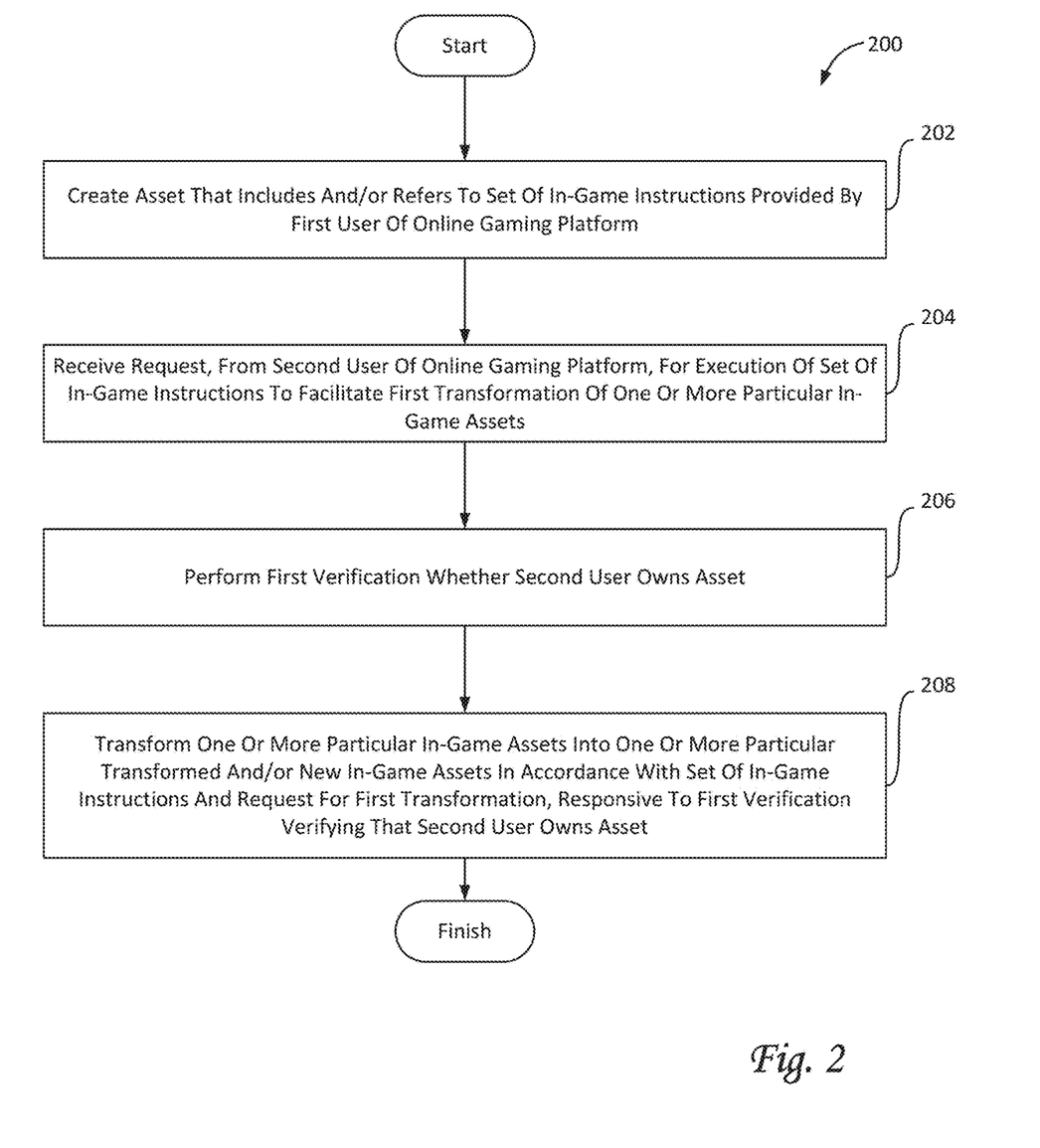
FIG. 2 illustrates a method for facilitating distribution of in-game instructions pertaining to an online gaming platform, in accordance with one or more implementations.

FIG. 2 illustrates a method 200 for facilitating distribution of in-game instructions pertaining to an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include creating an asset that includes and/or refers to a set of in-game instructions provided by a first user of the online gaming platform. Execution of the set of in-game instructions may facilitate a transformation of one or more in-game assets into one or more transformed and/or new in-game assets. The set of in-game instructions may specify one or more steps within the online gaming platform that perform the transformation of the one or more in-game assets. Completion of the transformation may require ownership of the asset. Operation 202 may be performed by one or more hardware processors configured by machine-readable instructions including a component that is the same as or similar to asset creating component 108, in accordance with one or more implementations.

An operation 204 may include receiving a request, from a second user of the online gaming platform, for execution of the set of in-game instructions to facilitate a first transformation of one or more particular in-game assets. Operation 204 may be performed by one or more hardware processors configured by machine-readable instructions including a component that is the same as or similar to transformation request component 110, in accordance with one or more implementations.

An operation 206 may include performing a first verification whether the second user owns the asset. Operation 206 may be performed by one or more hardware processors configured by machine-readable instructions including a component that is the same as or similar to verification performance component 112, in accordance with one or more implementations.

An operation 208 may include transforming the one or more particular in-game assets into one or more particular transformed and/or new in-game assets in accordance with the set of in-game instructions and the request for the first transformation, responsive to the first verification verifying that the second user owns the asset. Operation 208 may be performed by one or more hardware processors configured by machine-readable instructions including a component that is the same as or similar to transformation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating distribution of in-game instructions pertaining to an online gaming platform, the system comprising:
   one or more hardware processors configured by machine-readable instructions to:
      create a set of user-provided transformation instructions that are usable within an online gaming platform, wherein the set of user-provided transformation instructions include and/or refer to a set of executable in-game instructions provided by a first user of the online gaming platform, wherein execution of the set of executable in-game instructions facilitates a transformation of one or more in-game objects into one or more transformed in-game objects, wherein the one or more in-game objects include virtual items and/or characters that are usable within the online gaming platform, wherein the set of executable in-game instructions specifies one or more steps within the online gaming platform that perform the transformation of the one or more in-game objects, wherein the one or more steps are in-game actions performable by users of the online gaming platform to transform the one or more in-game objects, wherein the one or more transformed in-game objects are usable within the online gaming platform, and wherein completion of the transformation requires ownership of the set of user-provided transformation instructions;
      register the ownership of the set of user-provided transformation instructions as a particular address on a distributed blockchain such that a first address is registered as current owner of the set of user-provided transformation instructions, wherein the first address is associated with the first user, and wherein the particular address is associated with the current owner of the set of user-provided transformation instructions;
      receive information reflecting a sale of the set of user-provided transformation instructions by the first user to a second user of the online gaming platform, wherein, responsive to the sale of the set of user-provided transformation instructions, the set of user-provided transformation instructions has been added to an inventory of the second user that is maintained within the online gaming platform on behalf of the second user, wherein the second user is different from the first user;

register a transfer of the ownership of the set of user-provided transformation instructions on the distributed blockchain from the first address to a second address, wherein the second address is registered as current owner of the set of user-provided transformation instructions, wherein the second address is associated with the second user;

receive a request, from the second user of the online gaming platform, for execution of the set of executable in-game instructions included in and/or referred to by the set of user-provided transformation instructions to facilitate a first transformation of one or more particular in-game objects in accordance with the set of user-provided transformation instructions that have been created by the first user;

perform a first verification whether the current owner of the set of user-provided transformation instructions is registered as being the second address associated with the second user, as required for the completion of the request for the first transformation in accordance with the set of user-provided transformation instructions;

perform a second verification whether the second user owns the one or more particular in-game objects that are to be transformed in the first transformation as requested; and in response to the request, transform, by a transformation component, the one or more particular in-game objects into one or more particular transformed in-game objects in accordance with the set of executable in-game instructions and the request for the first transformation, responsive to the first verification verifying that the current owner of the set of user-provided transformation instructions is registered as being the second address associated with the second user, and further responsive to the second verification verifying that the second user owns the one or more particular in-game objects.

2. The system of claim 1, wherein the completion of the transformation requires ownership of at least one of an in-game capability and a given in-game object;

wherein the one or more hardware processors are further configured by machine-readable instructions to perform a third verification whether the second user owns at least one of the required in-game capability and the given in-game object;

wherein the first transformation is performed responsive to verifying that the second user owns at least one of the required in-game capability and the given in-game object.

3. The system of claim 1, wherein the one or more hardware processors are further configured by machine-readable instructions to:

implement the set of user-provided transformation instructions as a smart contract that is executable on the distributed blockchain, wherein the current owner of the set of user-provided transformation instructions is registered by including the particular address in the smart contract; and register the smart contract on the distributed blockchain;

wherein registering the transfer of the ownership of the set of user-provided transformation instructions includes changing the particular address included in the smart contract to the second address associated with the second user.

4. The system of claim 1, wherein the one or more hardware processors are further configured by machine-readable instructions to:

create the set of executable in-game instructions by the first user; and receive the set of executable in-game instructions from the first user.

5. The system of claim 1, wherein receiving the request implies consent to transform the one or more particular in-game objects.

6. The system of claim 2, wherein the first transformation does not destroy the set of user-provided transformation instructions, the in-game capability, or the given in-game object.

7. The system of claim 2, wherein the one or more hardware processors are further configured by machine-readable instructions to:

notify the second user, responsive to the third verification verifying that the second user fails to own at least one of the required in-game capability and the given in-game object.

8. A method for facilitating distribution of in-game instructions pertaining to an online gaming platform, the method comprising:

creating a set of user-provided transformation instructions that are usable within an online gaming platform, wherein the set of user-provided transformation instructions include and/or refer to a set of executable in-game instructions provided by a first user of the online gaming platform, wherein execution of the set of executable in-game instructions facilitates a transformation of one or more in-game objects into one or more transformed in-game objects, wherein the one or more in-game objects include virtual items and/or characters that are usable within the online gaming platform, wherein the set of executable in-game instructions specifies one or more steps within the online gaming platform that perform the transformation of the one or more in-game objects, wherein the one or more steps are in-game actions performable by users of the online gaming platform to transform the one or more in-game objects, wherein the one or more transformed in-game objects are usable within the online gaming platform, and wherein completion of the transformation requires ownership of the set of user-provided transformation instructions;

registering the ownership of the set of user-provided transformation instructions as a particular address on a distributed blockchain such that a first address is registered as current owner of the set of user-provided transformation instructions, wherein the first address is associated with the first user, and wherein the particular address is associated with the current owner of the set of user-provided transformation instructions;

receiving information reflecting a sale of the set of user-provided transformation instructions by the first user to a second user of the online gaming platform, wherein, responsive to the sale of the set of user-provided transformation instructions, the set of user-provided transformation instructions has been added to an inventory of the second user that is maintained within the online gaming platform on behalf of the second user, wherein the second user is different from the first user;

registering a transfer of the ownership of the set of user-provided transformation instructions on the distributed blockchain from the first address to a second address, wherein the second address is registered as current owner of the set of user-provided transformation instructions, wherein the second address is associated with the second user;

receiving a request, from the second user of the online gaming platform, for execution of the set of executable in-game instructions included in and/or referred to by the set of user-provided transformation instructions to facilitate a first transformation of one or more particular in-game objects in accordance with the set of user-provided transformation instructions that have been created by the first user;

performing a first verification whether the current owner of the set of user-provided transformation instructions is registered as being the second address associated with the second user, as required for the completion of the request for the first transformation in accordance with the set of user-provided transformation instructions;

performing a second verification whether the second user owns the one or more particular in-game objects that are to be transformed in the first transformation as requested; and in response to the request, transforming the one or more particular in-game objects into one or more particular transformed in-game objects in accordance with the set of executable in-game instructions and the request for the first transformation, responsive to the first verification verifying that the current owner of the set of user-provided transformation instructions is registered as being the second address associated with the second user, and further responsive to the second verification verifying that the second user owns the one or more particular in-game objects.

9. The method of claim 8, wherein the completion of the transformation requires ownership of at least one of an in-game capability and a given in-game object;

performing a third verification whether the second user owns at least one of the required in-game capability and the given in-game object;

wherein the first transformation is performed responsive to verifying that the second user owns at least one of the required in-game capability and the given in-game object.

10. The method of claim 8, further comprising:

implementing the set of user-provided transformation instructions as a smart contract that is executable on the distributed blockchain, wherein the current owner of the set of user-provided transformation instructions is registered by including the particular address in the smart contract; and registering the smart contract on the distributed blockchain;

wherein registering the transfer of the ownership of the set of user-provided transformation instructions includes changing the particular address included in the smart contract to the second address associated with the second user.

11. The method of claim 8, further comprising:

creating the set of executable in-game instructions by the first user; and receiving the set of executable in-game instructions from the first user.

12. The method of claim 8, wherein receiving the request implies consent to transform the one or more particular in-game objects.

13. The method of claim 9, wherein the first transformation does not destroy the set of user-provided transformation instructions, the in-game capability, or the given in-game object.

14. The method of claim 9, further comprising:

notifying the second user, responsive to the third verification verifying that the second user fails to own at least one of the required in-game capability and the given in-game object.

* * * * *